US012361721B2

(12) United States Patent
Yasui et al.

(10) Patent No.: US 12,361,721 B2
(45) Date of Patent: *Jul. 15, 2025

(54) IMAGE PROCESSING APPARATUS FOR ESTIMATING VEHICLE SPATIAL MOTION

(71) Applicant: HONDA MOTOR CO., LTD., Tokyo (JP)

(72) Inventors: Yuji Yasui, Wako (JP); Masamitsu Tsuchiya, Wako (JP); Akira Kanehara, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 489 days.

This patent is subject to a terminal disclaimer.

(21) Appl. No.: 17/693,543

(22) Filed: Mar. 14, 2022

(65) Prior Publication Data

US 2022/0309796 A1    Sep. 29, 2022

(30) Foreign Application Priority Data

Mar. 24, 2021   (JP) ................................ 2021-050360

(51) Int. Cl.
*G06V 20/58*   (2022.01)
*G06T 7/194*   (2017.01)
*G06T 7/38*   (2017.01)
*G06V 20/59*   (2022.01)

(52) U.S. Cl.
CPC ............. *G06V 20/58* (2022.01); *G06T 7/194* (2017.01); *G06T 7/38* (2017.01); *G06V 20/59* (2022.01)

(58) Field of Classification Search
CPC ......... G06V 20/58; G06V 20/59; G06T 7/215
See application file for complete search history.

(56) References Cited

U.S. PATENT DOCUMENTS

| 9,846,043 | B2 | 12/2017 | Aoki et al. | |
|---|---|---|---|---|
| 10,229,505 | B2 * | 3/2019 | Ding | ........................ G06T 7/20 |
| 10,565,714 | B2 * | 2/2020 | Hunt | ........................ G06T 3/14 |
| 10,872,433 | B2 | 12/2020 | Stein et al. | |
| 2005/0265453 | A1 * | 12/2005 | Saito | ....................... G06T 7/215 |
| | | | | 375/240.24 |
| 2010/0045799 | A1 * | 2/2010 | Lei | ....................... G06V 40/103 |
| | | | | 348/739 |

(Continued)

FOREIGN PATENT DOCUMENTS

| JP | 2009122990 A | * | 6/2009 |
|---|---|---|---|
| JP | 2013-186668 A | | 9/2013 |

(Continued)

OTHER PUBLICATIONS

Japanese Office Action for Japanese Patent Application No. 2021-050360 mailed Dec. 9, 2022 (partially translated).

*Primary Examiner* — Michael Robert Cammarata
(74) *Attorney, Agent, or Firm* — THOMAS | HORSTEMEYER, LLP

(57) ABSTRACT

An image processing apparatus that processes images acquired by a camera. In processing the images, a moving object may be recognized or identified from the images. Masking processing is performed on the moving object recognized in the image. An estimate of the spatial motion of the image processing apparatus relative to a surrounding environment is determined based on the images that are subjected to the masking processing.

11 Claims, 11 Drawing Sheets

(56) References Cited

U.S. PATENT DOCUMENTS

| | | | | |
|---|---|---|---|---|
| 2013/0235201 A1* | 9/2013 | Kiyohara | ............... | G08G 1/166 |
| | | | | 348/148 |
| 2016/0196654 A1* | 7/2016 | Aoki | ...................... | G06V 20/58 |
| | | | | 382/103 |
| 2016/0358022 A1* | 12/2016 | Dziurda | .................. | G06V 20/56 |
| 2018/0012068 A1* | 1/2018 | Tanaka | ................... | G06V 20/58 |
| 2019/0325595 A1 | 10/2019 | Stein et al. | | |
| 2020/0209402 A1* | 7/2020 | Abari | .................. | B60W 30/146 |
| 2021/0109543 A1* | 4/2021 | Hiromitsu | ............ | G06V 10/451 |
| 2021/0118161 A1 | 4/2021 | Stein et al. | | |
| 2022/0044424 A1* | 2/2022 | Jayaraman | .............. | G06T 7/521 |
| 2022/0301185 A1* | 9/2022 | Yasui | ..................... | B60W 50/14 |
| 2022/0301427 A1* | 9/2022 | Ueno | ........................ | H04N 7/18 |
| 2024/0029449 A1* | 1/2024 | Futatsugi | ................. | G08G 1/16 |
| 2024/0312341 A1* | 9/2024 | Baba | ........................ | G08G 1/16 |

FOREIGN PATENT DOCUMENTS

| | | | | |
|---|---|---|---|---|
| JP | 2016-126662 A | 7/2016 | | |
| JP | 2020-126432 A | 8/2020 | | |
| WO | 2019/202397 A8 | 7/2020 | | |
| WO | WO-2022064641 A1 * | 3/2022 | ............. | G06T 7/215 |

\* cited by examiner

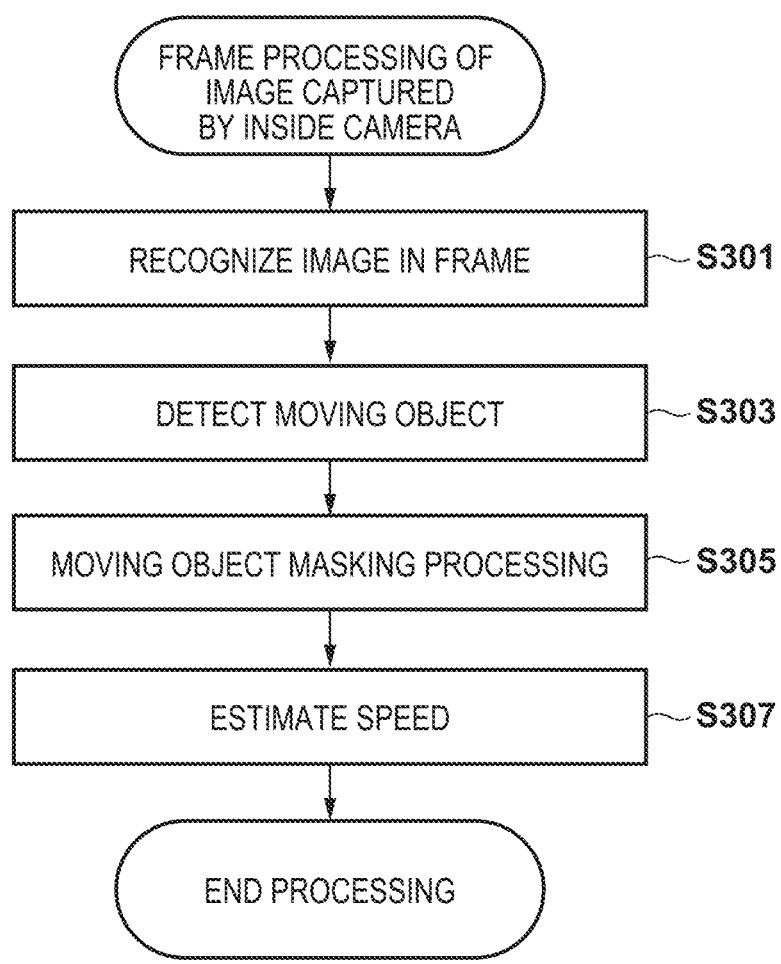

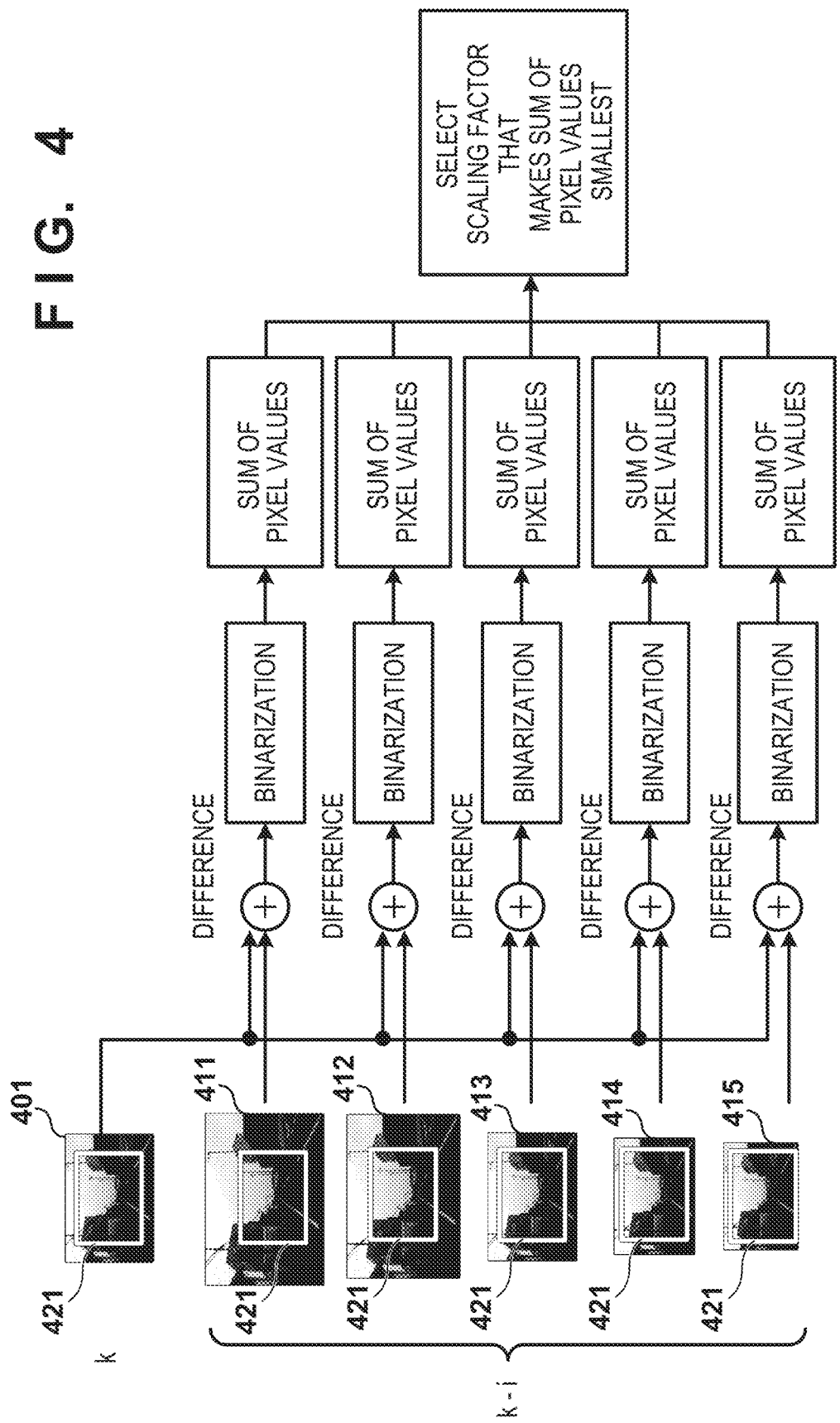

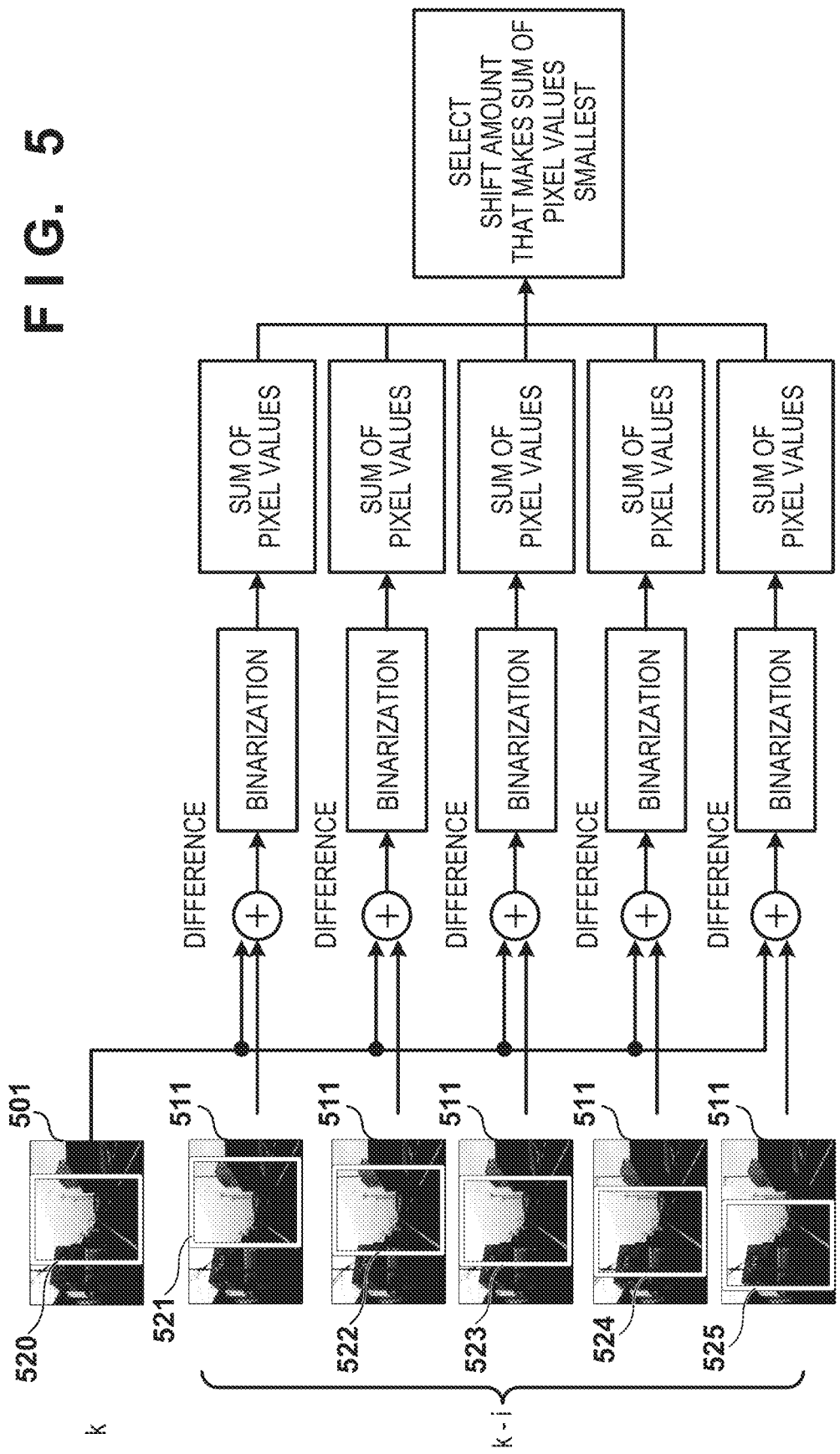

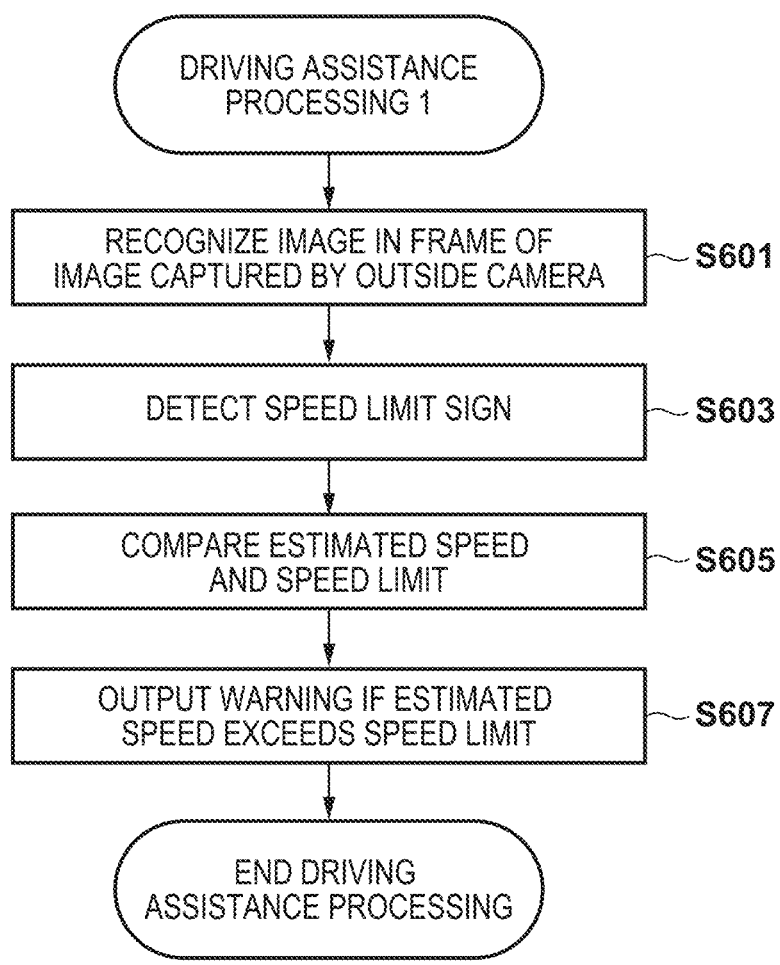

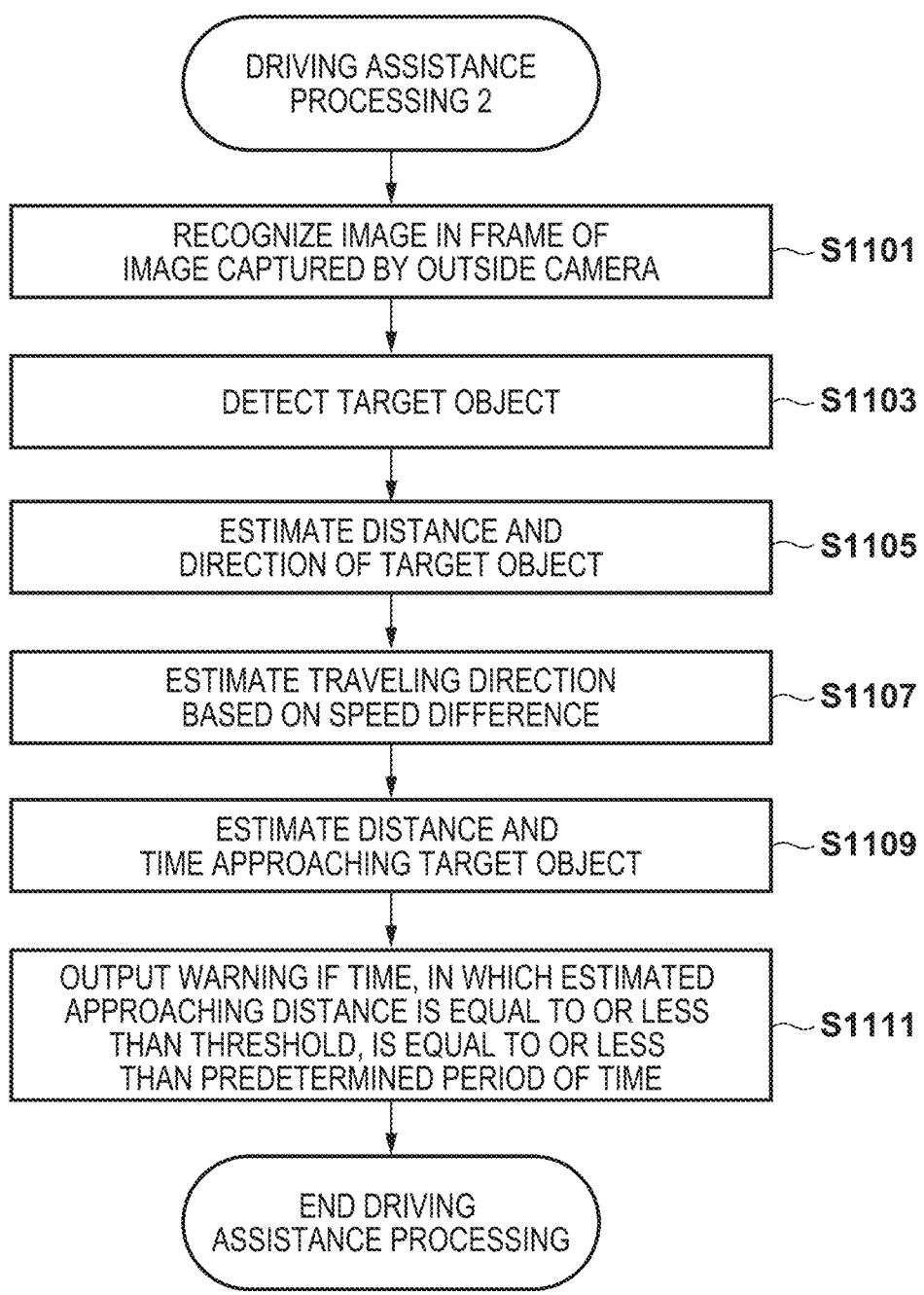

IMAGE PROCESSING APPARATUS FOR ESTIMATING VEHICLE SPATIAL MOTION

CROSS-REFERENCE TO RELATED APPLICATION(S)

This application claims priority to and the benefit of Japanese Patent Application No. 2021-050360 filed on Mar. 24, 2021, the entire disclosure of which is incorporated herein by reference.

BACKGROUND OF THE INVENTION

Field of the Invention

The present invention relates to an image processing apparatus, and more particularly to an in-vehicle image processing apparatus.

Description of the Related Art

Vehicles having a driving assistance function installed at the time of production have been widely used. Such a driving assistance function includes a function of detecting a traveling direction of a vehicle or a target object around the vehicle with a camera or radar to call attention to a driver or to steer or brake the vehicle. As an apparatus that performs such a driving assistance function, an apparatus that detects a moving object and outputs an alarm has been proposed (see, for example, Japanese Patent Laid-Open No. 2013-186668).

The apparatus disclosed in Japanese Patent Laid-Open No. 2013-186668 causes an in-vehicle camera to capture an image, calculates optical flow from the image thus captured, and detects a moving object from the optical flow. Furthermore, apparent motion due to water vapor or light source variation is detected from the optical flow, and a region containing a brightness change caused due to water vapor or light source variation is set as an alarm restriction region. Among detected moving objects, a moving object appearing in the alarm restriction region is regarded as being an invalid moving object and excluded from the alarm target.

In order to perform such a function, not only an image but also a signal obtained from a sensor of the vehicle such as a wheel speed obtained from a wheel speed sensor or a steering angle obtained from a steering angle sensor is provided to the apparatus disclosed in Japanese Patent Laid-Open No. 2013-186668, and the function is implemented by an ECU mounted on the vehicle. As described above, the wheel speed or the steering angle is obtained from a corresponding sensor of the vehicle, so that it is sufficient to recognize a moving object relative to a moving self-vehicle, and only light source variation and water vapor that appear to be a moving object but are not actual moving objects are excluded from the alarm target.

The apparatus disclosed in Japanese Patent Laid-Open No. 2013-186668 is designed to be installed in a vehicle at the time of production, so that it is difficult to retrofit the apparatus to an existing vehicle. In particular, when neither the wheel speed nor the steering angle provided from the vehicle is accessible, it is necessary to identify a behavior of the vehicle such as a vehicle speed or turning based on information acquired independently by a driving assistance apparatus retrofitted to the vehicle.

SUMMARY OF THE INVENTION

The present invention provides an image processing apparatus that is retrofittable to a vehicle and is capable of identifying a behavior of the vehicle with high accuracy. According to an aspect of the present invention, an image processing apparatus is provided which comprises: an image acquisition unit; and a processing unit configured to process an image acquired by the image acquisition unit, wherein the processing unit includes at least one processor and at least one memory storing at least one program, and the at least one program causes the at least one processor to: recognize a moving object from the image acquired by the image acquisition unit, perform masking processing on the moving object recognized in the image; and estimate spatial motion of the image processing apparatus based on the image subjected to the masking processing.

The present invention has the following configuration. Specifically, according to the present invention, it is possible to provide an image processing apparatus that is retrofittable to a vehicle and is capable of identifying a behavior of the vehicle with high accuracy.

BRIEF DESCRIPTION OF THE DRAWINGS

FIG. 3 is a flowchart of speed estimation processing performed by the driving recorder according to a first embodiment;

FIG. 4 is a diagram illustrating how a vehicle speed is estimated;

FIG. 5 is a diagram illustrating how a shift amount in a horizontal speed direction;

FIG. 6 is a flowchart of an example of driving assistance processing performed by the driving recorder according to the embodiment;

FIG. 11 is a flowchart of another example of the driving assistance processing performed by the driving recorder according to the embodiment.

DESCRIPTION OF THE EMBODIMENTS

Figure 1A:
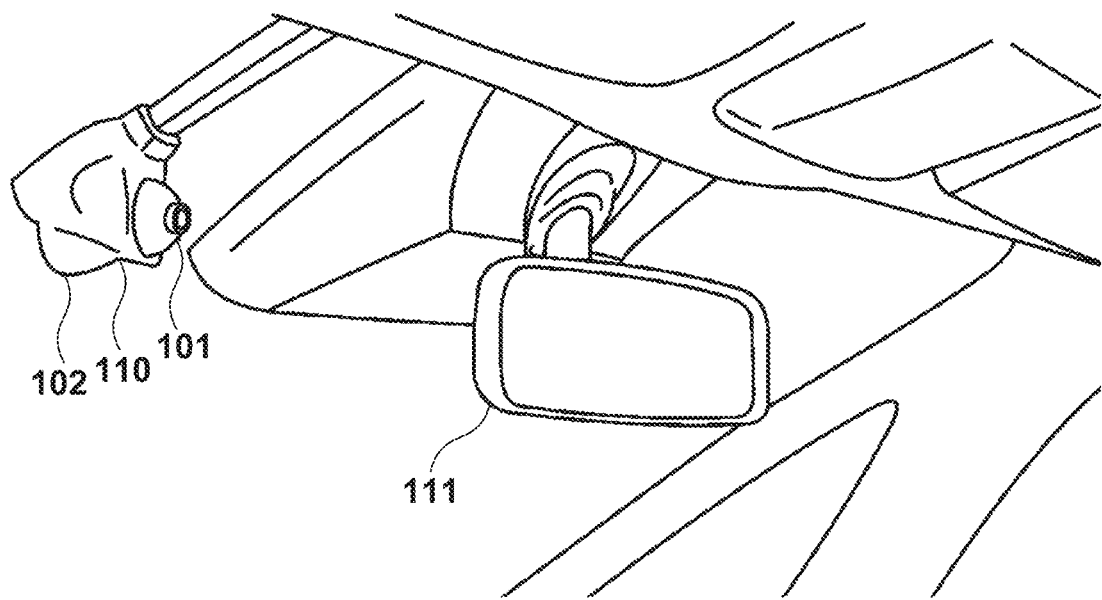
FIG. 1A is a view of a vehicle to which cameras of a driving recorder according to an embodiment have been attached.

Hereinafter, embodiments will be described in detail with reference to the attached drawings. Note that the following embodiments are not intended to limit the scope of the claimed invention, and limitation is not made an invention that requires all combinations of features described in the embodiments. Two or more of the multiple features described in the embodiments may be combined as appropriate. Furthermore, the same reference numerals are given to the same or similar configurations, and redundant description thereof is omitted.

First Embodiment

Configuration of Vehicle with Driving Recorder Attached Thereto

Figure 1B:
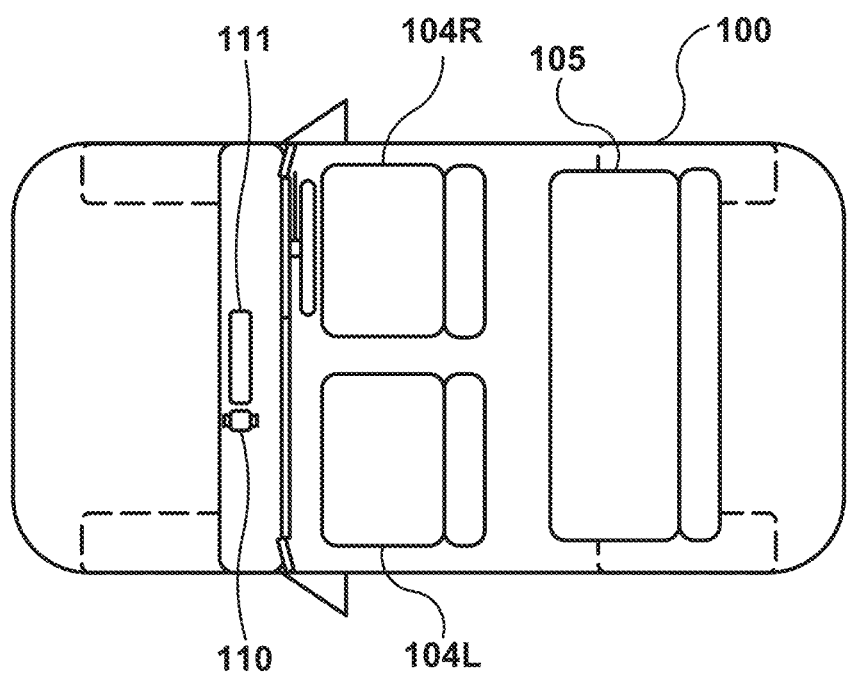
FIG. 1B is a view of the vehicle to which the cameras of the driving recorder according to the embodiment have been attached.

FIGS. 1A and 1B are diagrams illustrating a state in which a driving recorder according to the present embodiment has been attached to a vehicle 100. FIG. 1A illustrates an upper part of a windshield of the vehicle, viewed from the direction of a front seat on the left side. A rearview mirror 111 is provided at the center of the upper part of the windshield. In addition, a camera unit 110 of the driving recorder is provided on the left side thereof. The camera unit 110 includes an inside camera 101 and an outside camera 102. The inside camera 101 is provided in such a way as to face rearward, and captures an image of the inside of the vehicle. The outside camera 102 is provided in such a way as to face forward, and captures an image of a forward view through the windshield of the vehicle. In the present example, the inside camera and the outside camera each have a single lens. The imaging ranges of the inside camera 101 and the outside camera 102 can be independently adjusted. However, since the inside camera 101 employs a wide-angle lens or a fisheye lens, the imaging range may be fixed.

A main body including a control unit may be incorporated in the camera unit 110, or may be provided at a position away from the camera unit 110 and connected to the camera unit 110 by a cable.

FIG. 1B illustrates the vehicle 100 viewed from above through its roof. In this example, the front (forward in the traveling direction) of the vehicle 100 is on the left side of the drawing, and the camera unit 110 is provided on the left side of the rearview mirror 111 when facing forward. A right front seat (also referred to as a driver's seat in the case of a vehicle with a right-side steering wheel) 104R, a left front seat (also referred to as a passenger seat in the case of a vehicle with a right-side steering wheel) 104L, and a rear seat 105 are provided in the vehicle 100. A window is provided as a transparent part on each side of the vehicle 100, so that the outside of the vehicle 100 can be observed from the inside of the vehicle 100 through the windows. Note that the windows are made of glass, and function as the transparent parts regardless of whether the windows are open or closed. Furthermore, the inside camera 101 of the camera unit 110 can capture an image of scenery outside the vehicle through the windows together with occupants in the front seats 104R and 104L and the rear seat 105. That is, the captured image includes an image of the inside of the vehicle 100 and an image of the outside of the vehicle 100. Thus, an image is captured such that a moving object such as a vehicle located outside is also included in the image.

Note that the camera unit 110 may be provided on the right side of the rearview mirror 111. However, it is desirable that the imaging range of the inside camera 101 be adjusted such that the optical axis of the lens of the inside camera 101 is along a symmetry plane of the windows provided in such a way to have symmetry with respect to the plane, that is, parallel to the symmetry plane. Furthermore, it is desirable that the camera unit 110 be located at a position as close as possible to the rearview mirror 111. These are to reduce a bilateral difference in speed estimated from images of the outside captured through the left and right windows, due to the deviation of the direction of the camera from the symmetry plane. In this manner, the camera unit 110 is provided in the internal space of the vehicle 100 separated from the outside.

Configuration Example of Driving Recorder

Figure 2:
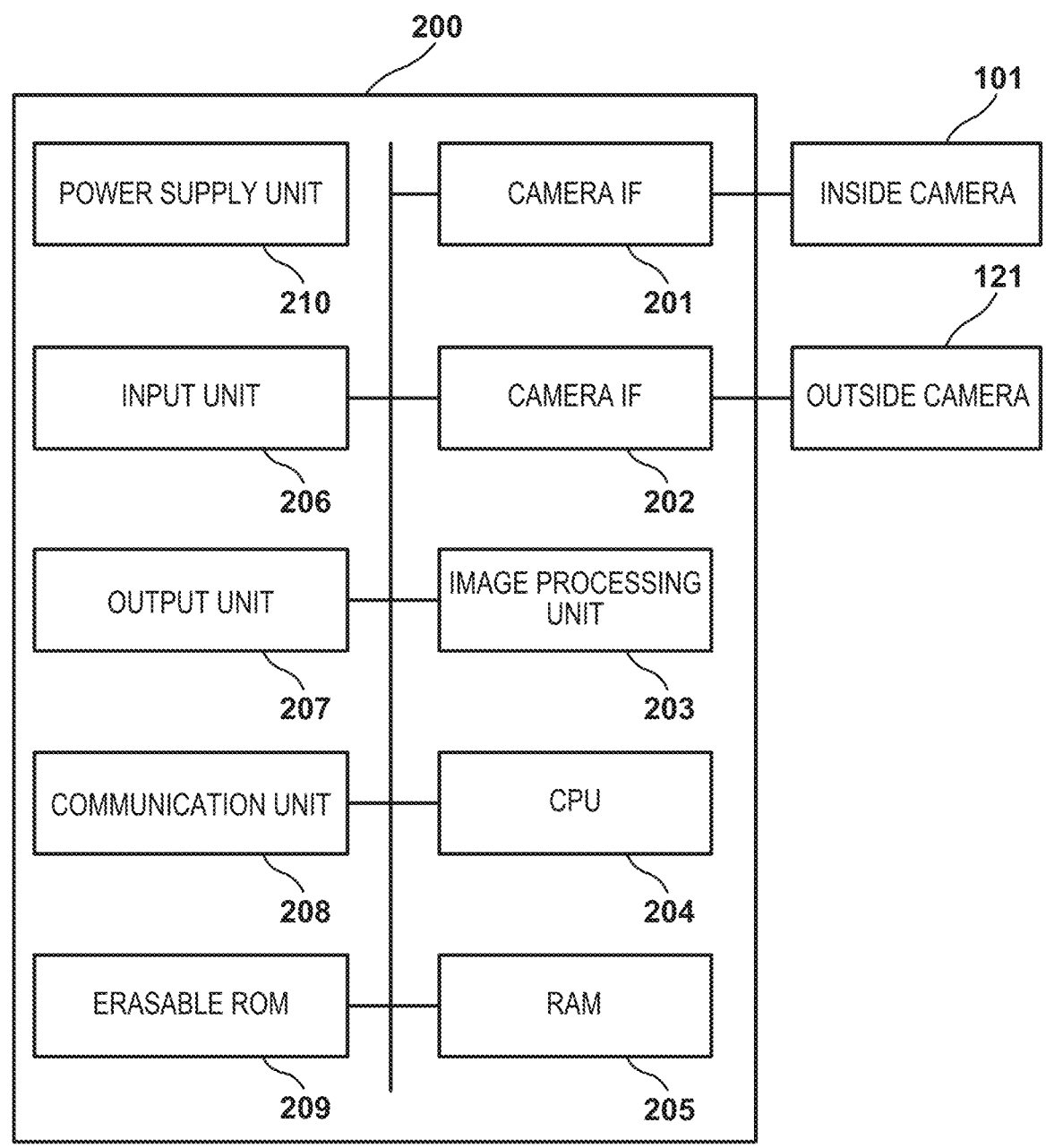
FIG. 2 is a block diagram of a control configuration of the driving recorder according to the embodiment.

FIG. 2 shows an example of a control configuration of the driving recorder according to the embodiment. This driving recorder is retrofitted to the vehicle, and there is no need for an external signal to be input thereto. However, power supply to the driving recorder depends on the vehicle 100. In addition, a device mounted on the vehicle 100 can also be used as a user interface. A configuration and procedure for implementing driving assistance by performing image processing with the driving recorder will be described in the present embodiment. Therefore, the driving recorder may be referred to as an image processing apparatus or a driving assistance apparatus, focusing on this point.

In FIG. 2, the driving recorder includes a control unit 200, the inside camera 101, and the outside camera 102. These cameras, particularly the inside camera 101, may be referred to as an image acquisition unit or the like. Camera interfaces (IFs) 201 and 202 are signal interfaces with the inside camera 101 and the outside camera 102, respectively. Each camera shoots video (captures a moving image) at a predetermined frame rate of, for example, 29 frames per second (fps). The captured image is subjected to image processing by an image processing unit 203, and further subjected to necessary processing by a central processing unit (CPU) 204. Then, the captured image is stored as a video file in an erasable read-only memory (ROM) 209. The video file includes video of a predetermined period of time, for example, about 30 seconds to 60 seconds. When recording for the predetermined period of time is finished, a new video file is recorded. There are at least two video files. When there is no free space in the erasable ROM 209, the oldest video file is erased to secure free space, and a new video file is recorded therein.

In order to function as a driving recorder, the driving recorder also includes an acceleration sensor and the like, and performs control such that, for example, the recording of a video file is stopped when an acceleration exceeding a predetermined value is detected. However, in order to describe the driving recorder by focusing on its driving assistance function, description of the function thereof as a driving recorder and description of the device are omitted in the present embodiment.

A communication unit 208 provides a wire or wireless communication function. For example, in order to output a warning to be described below, the driving recorder may be connected to a smartphone or the like via the communication unit 208 such that a warning is output to the smartphone or the like. Furthermore, as a matter of course, it is also possible to perform communication for other purposes.

An input unit 206 and an output unit 207 each include an input/output unit as a user interface. The input/output units may each be implemented by, for example, a touchscreen included in an operation unit. Alternatively, there may be provided an interface for connecting the driving recorder to a display audio device provided in the vehicle 100. A random access memory (RAM) 205 is used as a data memory necessary for operation of the CPU 204 and the image processing unit 203 and as a memory for storing a program to be executed by the CPU 204. A power supply unit 210 is connected to power supply provided from the vehicle 100, and provides power suitable for the driving recorder.

Processing to be described with reference to FIG. 3 and the subsequent drawings is performed by the CPU 204, or may be performed by the image processing unit 203. In any case, an entity responsible for the processing may be referred to as a processing unit. Further, the control unit 200 may be referred to as a processing unit.

Speed Estimation Processing on Image

FIG. 3 shows a procedure of estimating the speed of the vehicle 100 from an image captured by the inside camera 101. An image to be captured is a moving picture composed of frames (or image frames) captured at predetermined time intervals, and may be referred to as a moving image or a video. In the procedure shown in FIG. 3, one frame (frame k) captured by the inside camera 101 is acquired, and the speed estimation processing is performed on the frame k and a frame k–1 immediately before the frame k. Therefore, for the speed estimation processing, the captured frame is held until at least the next frame is captured and the speed estimation processing is performed. The frame k to be processed is also referred to as a target frame. Note that the processing shown in FIG. 3 is performed in real time concurrently with capturing.

In FIG. 3, the target frame is read into, for example, the RAM 205, and is then subjected to the processing shown in FIG. 3. The entity responsible for the processing may be, for example, the CPU 204. First, in-frame image recognition is performed (S301). An object to be recognized in step S301 is a moving object, and thus the moving object is detected as a result of the recognition (S303). The moving object includes an object that can move autonomously or move by external force (an object and a living thing such as a person). Specifically, the moving object includes a vehicle such as an automobile or a bicycle, a person, an animal such as a dog or a cat, and a movable object such as a handkerchief. In order to recognize such moving objects, for example, a learned model built in advance by learning appearances of moving objects in machine learning is stored in, for example, the erasable ROM 209, and a recognition result may be obtained from the learned model using the target frame as an input. The output may be information indicating a region corresponding to a moving object that appears in the target frame. Alternatively, feature information on various moving objects viewed from various viewpoints is stored in, for example, the erasable ROM 209, the feature information is compared with a feature point extracted from the target frame, and when there is a correlation of a predetermined degree or more, a region corresponding to the feature may be identified as a moving object.

Next, a region including the moving object thus detected is masked (S305). In the masking processing, for example, the region of the moving object may be uniformly filled with a specific color such as black or white. The captured frame includes an inside view of the vehicle and an outside view seen through the windows. The image capturing the outside view seen from the vehicle may include a moving object such as another vehicle or a person. Further, the image capturing the inside view of the vehicle may include a movable object such as an occupant or a handkerchief placed in the vehicle, or a moving object such as a suspended accessory or a charm. Therefore, in step S305, the region of the moving object detected from the frame is subjected to the masking processing. In the masking processing, the moving object detected from the image is covered with, for example, a black region and masked. This causes a stationary object to remain in the image.

Returning to FIG. 3, after the moving object is masked, the target frame is stored in the RAM 205 or the like. Then, the speed of the vehicle 100 is estimated from the target frame and the frame captured in the past (S307). The masking processing in S305 causes the moving object in the image in the frame to be masked, and the motion of such an object is apparent motion caused by the motion of the vehicle 100. FIGS. 4 and 5 show examples of how to estimate the speed.

Next, processing of estimating a movement amount (speed level) of the vehicle will be described with reference to FIGS. 4 and 5. Note that the speed level refers to a movement speed of the vehicle. The speed level, however, may be represented as a degree of speed (for example, high speed, medium speed, or low speed) associated with the movement speed in advance. The driving recorder acquires images captured by the inside camera 101 at, for example, predetermined time intervals. For example, the control unit 200 acquires a captured image (frame) 401 captured at a certain time (for example, k) and a captured image captured at a time earlier than the time k (for example, k–1). According to the present embodiment, such a captured image may be an image captured through the front or rear window of the vehicle, but the image captured through the rear window is used in this example. When the image captured through the front window is used, a result of determination as to whether the vehicle is moving forward or backward is reversed. In the examples shown in FIGS. 4 and 5, the moving object is not included in the image and thus is not clearly shown, but is masked in step S305 shown in FIG. 3.

The control unit 200 scales the captured image captured at the time k–1 up or down by a plurality of mutually different scaling factors to form scaled images. For example, the captured image captured at the time k–1 is scaled by stepwise-different scaling factors $\{E_n, E_m, \ldots, 1, \ldots, R_m, R_n\}$ (where $E_n > E_m > \ldots > 1 > \ldots > R_m > R_n > 0$) to form scaled images (for example, scaled images 411 to 415). Then, the control unit 200 cuts out a predetermined region 421 from each of the scaled images 411 to 415 thus formed and the captured image 401. At this time, the predetermined regions thus cut out have the same size and have the same center as the center of the captured images captured at the times k and k–1. The scaling factors $\{E_n, E_m, \ldots, 1, R_m, R_n\}$ are each associated with a corresponding speed level at which the vehicle moves forward or backward. This makes an image scaled by a certain scaling factor similar to an image captured at the next timing (that is, time k) when the vehicle travels at the associated speed.

The control unit 200 calculates a difference between the pixel values of the predetermined region cut out from the captured image 401 captured at the time k and the pixel values of the predetermined region 421 of each of the scaled images 411 to 415 obtained by scaling the captured image captured at the time k–1 to form a plurality of subtraction images. The difference may be a difference between corresponding pixels.

The control unit 200 converts each of the plurality of subtraction images thus obtained into a binary image and calculates the sum of the pixel values of the binary image. The binarization may be processing in which, for example, a predetermined binarization threshold is compared with each pixel value, when the difference is greater than the threshold, the comparison result is determined to be 1, and when the difference is equal to or less than the threshold, the comparison result is determined to be 0. Accordingly, the sum of the pixel values of the binary image represents the number of pixels having a pixel value of "1". The control unit 200 selects a scaling factor that makes the sum of the pixel values the smallest among the sums of the pixel values of the subtraction images converted into the binary images each associated with a corresponding scaling factor. For example, when the captured image captured at the time k−1 is scaled by $E_n$, $E_m$, 1, $R_m$, and $R_n$, and the sum of the pixel values of the scaled image scaled by $E_m$ is the smallest among the scaled images, the control unit 200 selects the scaling factor $E_m$. The sum of pixel values after binarization represents the number of pixels having a pixel value of 1. That is, the number of pixels greater in difference between corresponding pixels than the threshold is represented by the sum of pixel values. Further, the image capture rate (frame rate) is constant, so that the selected scaling factor is a value corresponding to the speed of the vehicle. Therefore, with each scaling factor associated with a corresponding speed level of the vehicle, the speed level associated with the scaling factor $E_m$ is estimated as the speed level (movement amount) of the vehicle 100. Note that the inside camera 101 is fixed in a stationary manner, so that the position of the front window or the position of the rear window in the captured image falls within, for example, a range extending by a specified width from the image center, and when the speed is estimated by the processing shown in FIG. 4, only the window region may be used.

Note that the present embodiment is described based on an example where the subtraction image is converted into a binary image, but the subtraction image may be subjected to different image processing instead of the binarization. Further, the control unit 200 may perform predetermined image processing such as conversion of each image into an intensity image or edge enhancement before calculating a difference.

Next, processing of estimating a movement amount (horizontal movement amount) of the vehicle will be described with reference to FIG. 5. Herein, the horizontal movement amount is a movement amount in a left-right direction, and not only a turning direction (or traveling direction) of the vehicle, but also a turning amount can be estimated based on the horizontal movement amount. As described above, the driving recorder acquires a captured image captured by the inside camera 101 at, for example, the predetermined time intervals. For example, the control unit 200 acquires a captured image 501 captured at a certain time (for example, k) and a captured image captured at a time earlier than the time k (for example, k−1). The control unit 200 cuts out, from the captured image captured at the time k−1, a predetermined region horizontally shifted from the image center by a plurality of mutually different shift amounts. For example, the predetermined regions (for example, predetermined regions 521 to 525) shifted by stepwise-different shift amounts $\{-S_n, -S_m, \ldots, 0, \ldots, S_m, S_n\}$ (where, $S_n > S_m > \ldots > 0$) are cut out from the captured image captured at the time k−1. The control unit 200 further cuts out a predetermined region 520 from the captured image 501. The shift amounts $\{-S_n, -S_m, \ldots, 0, \ldots, S_m, S_n\}$ are each associated with a corresponding movement amount by which the vehicle moves leftward or rightward. This makes a region cut out by a certain shift amount similar to a predetermined region obtained by cutting out a center part of an image captured when the vehicle moves by the associated movement amount.

The control unit 200 calculates a difference between the pixel values of the predetermined region 520 cut out from the captured image 501 captured at the time k and the pixel values of each of the predetermined regions 521 to 525 cut out from a captured image 511 to form a plurality of subtraction images.

The control unit 200 converts each of the plurality of subtraction images thus obtained into a binary image and calculates the sum of the pixel values of the binary image.

The control unit 200 selects a shift amount that makes the sum of the pixel values the smallest among the sums of the pixel values each associated with a corresponding shift amount. For example, when the sum of the pixel values of the predetermined region shifted by $S_m$ is the smallest among the predetermined regions shifted by the shift amounts $-S_n, -S_m, 0, S_m, S_n$ of the captured image captured at the time k−1, the control unit 200 selects the shift amount $S_m$. As described above, since each shift amount is associated with a corresponding movement amount of the vehicle, the movement amount associated with the shift amount $S_m$ is estimated as the horizontal movement amount of the vehicle 100.

Note that, in the processing shown in FIG. 5, when the image k−1 is horizontally shifted, the image k−1 may be scaled by the scaling factor selected in the processing shown in FIG. 4 and shifted by predetermined pixels. This makes distances in the images to be compared coincide with each other, allowing the shift amount to be estimated with higher accuracy. Furthermore, with the scaling factor selected in the manner as shown in FIG. 4 and the shift amount selected in the manner as shown in FIG. 5 associated with each other, a traveling path of the vehicle 100 may be estimated. For example, with a curvature, a radius, or the like in cornering associated with a corresponding scaling factor and shift amount and stored, a corresponding value may be determined as a value indicating the current traveling path from the stored values. For example, with the region of the rear window selected as the target image, a movement amount in a vehicle width direction can be estimated from the shift amount, which corresponds to a rotation amount of the vehicle 100 about a yaw axis during the time interval between frames. On the other hand, since the speed can be estimated from the scaling factor, the curvature, the radius, or the like in cornering can be associated with the scaling factor and the shift amount as described above. Further, when it is determined that the vehicle is moving either leftward or rightward, the regions 521 to 525 to be cut out may be shifted in the direction in which the vehicle turns. That is, the direction that brings the two images into correlation is shifted. In this case, the position of the region to be cut out is shifted in a direction opposite to the turning direction of the vehicle. This makes it possible to bring the images into correlation with higher reliability. The region thus cut out may be referred to as a converted region, and the center of converted region may be referred to as an image conversion center.

Driving Assistance Procedure

The speed of the vehicle estimated as described above may be used, for example, for driving assistance processing shown in FIG. 6. In this example, driving assistance is provided based on the speed as spatial motion of the vehicle 100. FIG. 6 shows a procedure of predicting the possibility of contact with a target object and outputting a warning. The procedure shown in FIG. 6 is performed in real time by the CPU 204 on, for example, video captured by the outside camera 102.

First, frames of the video captured by the outside camera 102 are acquired and then subjected to image recognition (S601) for detecting the target object, specifically, a speed limit sign (S603). Next, the speed of the vehicle 100 obtained by the procedure shown in FIG. 3 is compared with a speed limit recognized from the sign (S605). When the estimated speed exceeds the speed limit, a warning about the fact is output (S607). The warning may be output in visual or audio from the output unit 207, may be output to a smartphone, or may be output via a connected display audio device. As described above, it is possible to predict the possibility of an overspeed and warn the driver when there is the possibility.

As described above, according to the present embodiment, a moving object appearing in an image is masked, and the speed is estimated based on a stationary object, so that the estimation accuracy is made higher.

Second Embodiment

Speed Estimation Processing on Image

Figure 8:
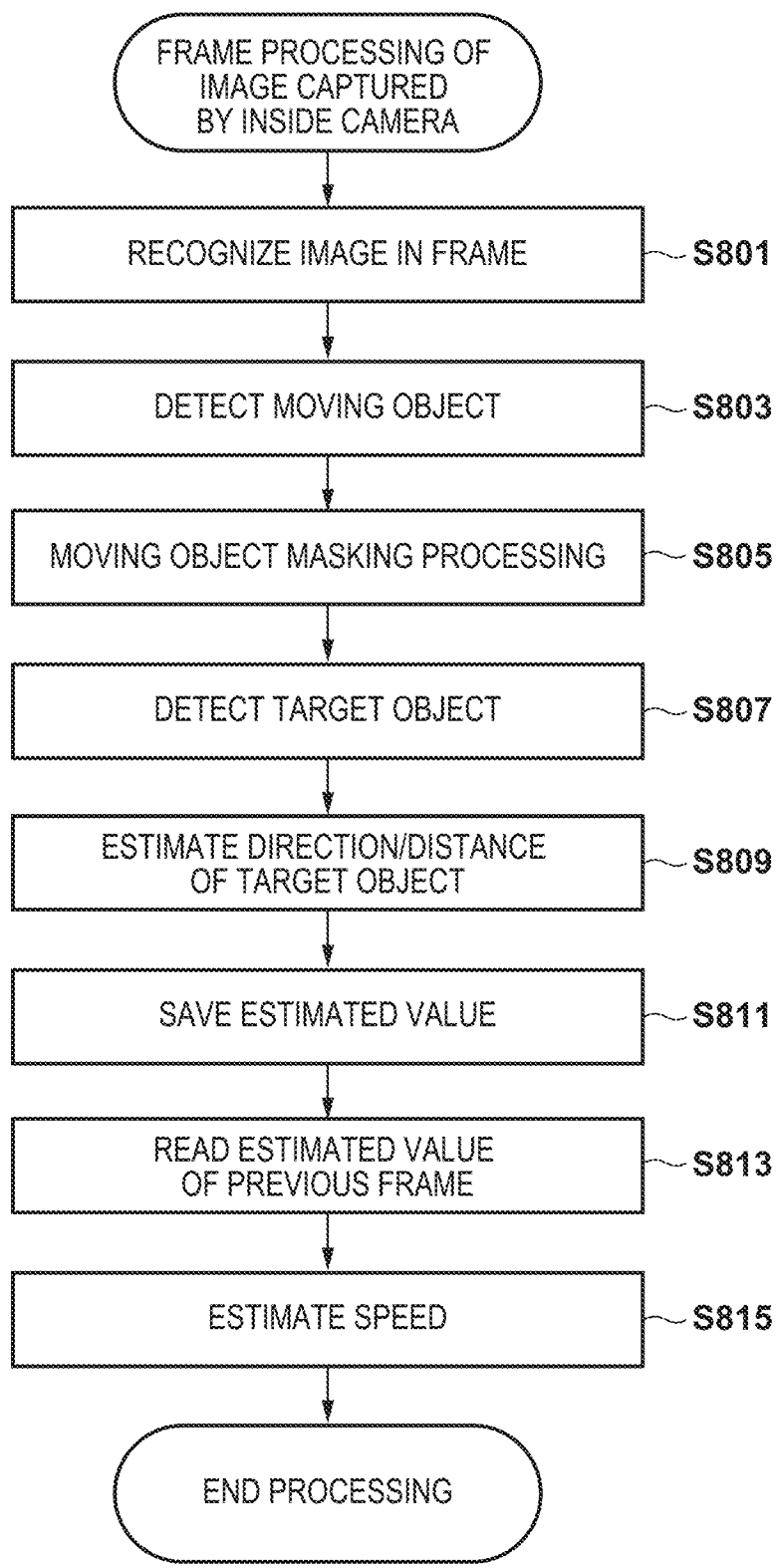
FIG. 8 is a flowchart of speed estimation processing performed by the driving recorder according to a second embodiment.

According to the present embodiment, a procedure shown in FIG. 8 is performed instead of the procedure shown in FIG. 3 to estimate the speed with the configuration shown in FIGS. 1A, 1B, and 2 that is the same as in the first embodiment. Note that steps S801 to S805 shown in FIG. 8 are the same as steps S301 to S305 shown in FIG. 3. The masking processing in step S301 will be described below.

Figure 7A:
FIG. 7A is a diagram illustrating an example of how a moving object is detected and masked in an image.
Figure 7B:
FIG. 7B is a diagram illustrating an example of how a moving object is detected and masked in an image.

FIGS. 7A and 7B show examples of how to detect and mask a moving object from a part of the target frame. A frame shown in FIGS. 7A and 7B is obtained by cutting out a right half of the frame captured by the inside camera 101, and a left half of the frame having an approximately symmetrical relationship with the right half for the arrangement of the windows is omitted. Even when the left half contains an image different from the image of the right half, the same processing is performed on the left half and the right half.

FIG. 7A is a diagram showing a state where a moving object is detected from a frame 700 that is the target frame. The frame 700 includes an inside view of the vehicle and an outside view seen through the windows. The image capturing the outside view seen from the vehicle may include a moving object such as another vehicle or a person. Further, the image capturing the inside view of the vehicle may include a movable object such as an occupant or a handkerchief placed in the vehicle, or a moving object such as a suspended accessory or a charm. FIG. 7A shows a region where such moving objects are detected. Here, a region 701 (vehicle) and a region 702 (person) are detected as moving objects outside the vehicle, and a region 703 (handkerchief) is detected as a moving object inside the vehicle. In the detection processing, it is not particularly necessary to distinguish between the outside and the inside of the vehicle.

FIG. 7B is a diagram showing a state where the masking processing is performed on the regions of the moving objects detected from the frame 700. The detected moving objects are masked with a mask 711 and a mask 713. Although each mask is represented as a hatching pattern for the sake of visibility of the drawing, the mask may be uniformly filled with pixels of the same color such as black or and white. In FIG. 7B, a solid filled region also serves as the region of the detected moving object, but the region may include a margin having a predetermined width.

After the moving object is masked in step S805 shown in FIG. 8, the detection of the target object is performed on the target frame (S807). The processing in step S807 may be the same as in step S803, but the target to be detected is different. Here, image recognition is performed on a target object that will be seen outside the vehicle. Examples of the target object to be detected may include a structure such as a building, a facility such as a utility pole or a signboard, a tree, and the like. When the target object is detected, a direction of and a distance to the target object are estimated with reference to the target object (S809). To do so, for example, when the camera unit 110 is attached, a direction of an optical axis of the inside camera 101, specifically, the horizontal direction, may be input from the input unit 206 and used as a reference. Alternatively, it may be assumed that the camera unit 110 is attached to cause the optical axis of the inside camera 101 to be along a longitudinal direction of the vehicle 100. Once the reference direction is determined in this manner, the direction can be estimated based on a distance from the center of the frame image, that is, the position of the optical axis, in the horizontal direction.

An example of a method for estimating a distance performed in step S809 will be described with reference to FIG. 9. In order to perform this method, calibration is performed on a relationship between the target object and the distance in the frame after the camera unit 110 is attached. In the method of this example, a boundary between the target object and a road surface is detected from the frame image, and a distance to the boundary is estimated. To do so, the boundary (that is, a ground contact position) between the target object and the road surface appearing in the frame captured by the inside camera 101 is identified, the distance from the camera unit 110 to the ground contact position is actually measured, and the height of the ground contact position in the frame of the identified boundary and the actual distance to the ground contact position are associated with each other. This association is stored in the erasable ROM 209 or the like. The camera unit 110 is fixed stationary to the vehicle 100, so that it is possible to estimate, based on the association as a reference, a distance to a position identified in the frame image on the condition that the position exists on the road surface. Note that, according to the present embodiment, a height from the ground contact position to the optical axis, that is, a horizontal line including the image center, instead of the height of the ground contact position identified in the frame, and the distance from the camera unit 110 to the ground contact position are associated with each other, but a height from a lower side of the frame to the horizontal line including the optical axis is constant, so that the two are the same. The height of the ground contact position in the image and the actual distance to the ground contact position that are associated with each other and stored in advance are denoted by h0 and L0, respectively.

Figure 9:
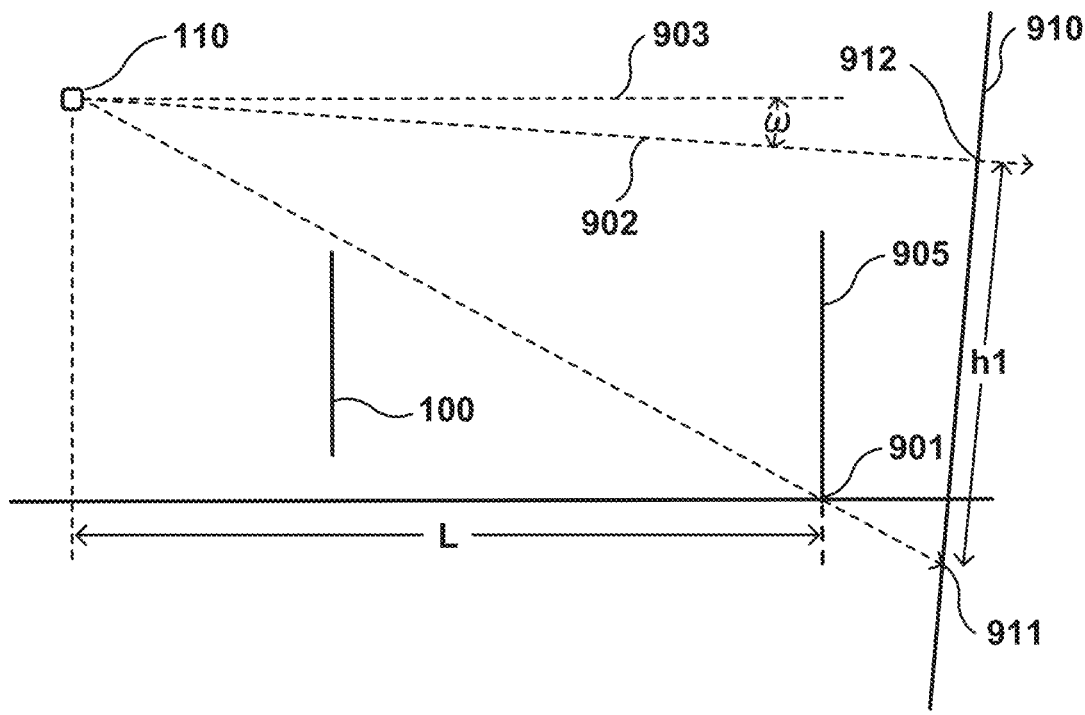
FIG. 9 is a diagram illustrating a principle of how to estimate a distance to a target object.

In FIG. 9, the camera unit 110 is attached to the vehicle 100 to cause an optical axis 902 of the inside camera 101 to form a depression angle $\omega$ relative to a horizontal direction 903. It is assumed that the inside camera 101 captures an image of a scene including a target object 905 through the windows of the vehicle 100, and the image is projected on an image 910. The image 910 indicates a correspondence between the target object whose image is captured and the image. A ground contact position 901 where the target object 905 is in contact with the road surface (a surface that is not the road but is substantially flush with the road is referred to as a road surface) corresponds to a position 911 in the image 910. A height in a frame from a position 912 (referred to as a center position) at which the optical axis 902 is projected on the image 910 to the position 911 is denoted by h1, and a distance to the ground contact position 901 to be obtained is denoted by L. In this case, since L0: h0=L: h1, L=h1·L0/h0 is given.

When the boundary between the target object and the road surface fails to be identified, for example, an association between a size (angle of view), in the image, of the target object whose size is easily estimated and the distance is stored in advance, and the distance may be estimated based on the association as a reference. For example, a standard thickness of a utility pole or the like is predetermined, and an angle of view of the thickness and a distance are associated with each other and stored in advance. When the utility pole is detected from the frame, a distance is estimated based on a value obtained by multiplying the distance associated with the predetermined thickness by a ratio between the angle of view of the thickness of the utility pole and the angle of view of the thickness stored in advance. This is the same as described with reference to FIG. 9.

As described above, in step S809, the direction of and the distance to the target object are estimated. Note that this estimation is performed on both the right half and the left half of the frame captured by inside camera 101. Returning to FIG. 8, the estimated direction and distance are stored (S811). Next, the direction of and the distance to the target object stored in step S811 as a result of performing the processing shown in FIG. 8 on the previous frame are read (S813). Then, the speed of the vehicle 100 is estimated based on the estimated value obtained in step S809 and the estimated value read in step S813 (S815). The speed thus estimated is stored. The speed estimation is also performed on both the left half and the right half of the frame based on the value estimated from the right half of the frame and the value estimated from the left half of the frame. Note that, in order to estimate the speed, the target object needs to be the same between frames. Therefore, the image of the target object detected in the previous frame is associated with the position of the target object and stored, a correlation with the image of the target object detected in each target frame is obtained, and when the correlation value is equal to or greater than a certain value, the target object may be determined to be the same. In this case, the speed is estimated based on the direction of and the distance to the target object determined to be the same between the frames. Furthermore, the lower speed between the estimated left and right speeds can be determined to be the turning direction (or the traveling direction). The radius of the turn can also be estimated from an average speed of the left and right speeds and a speed difference between the left and right speeds.

Figure 10:
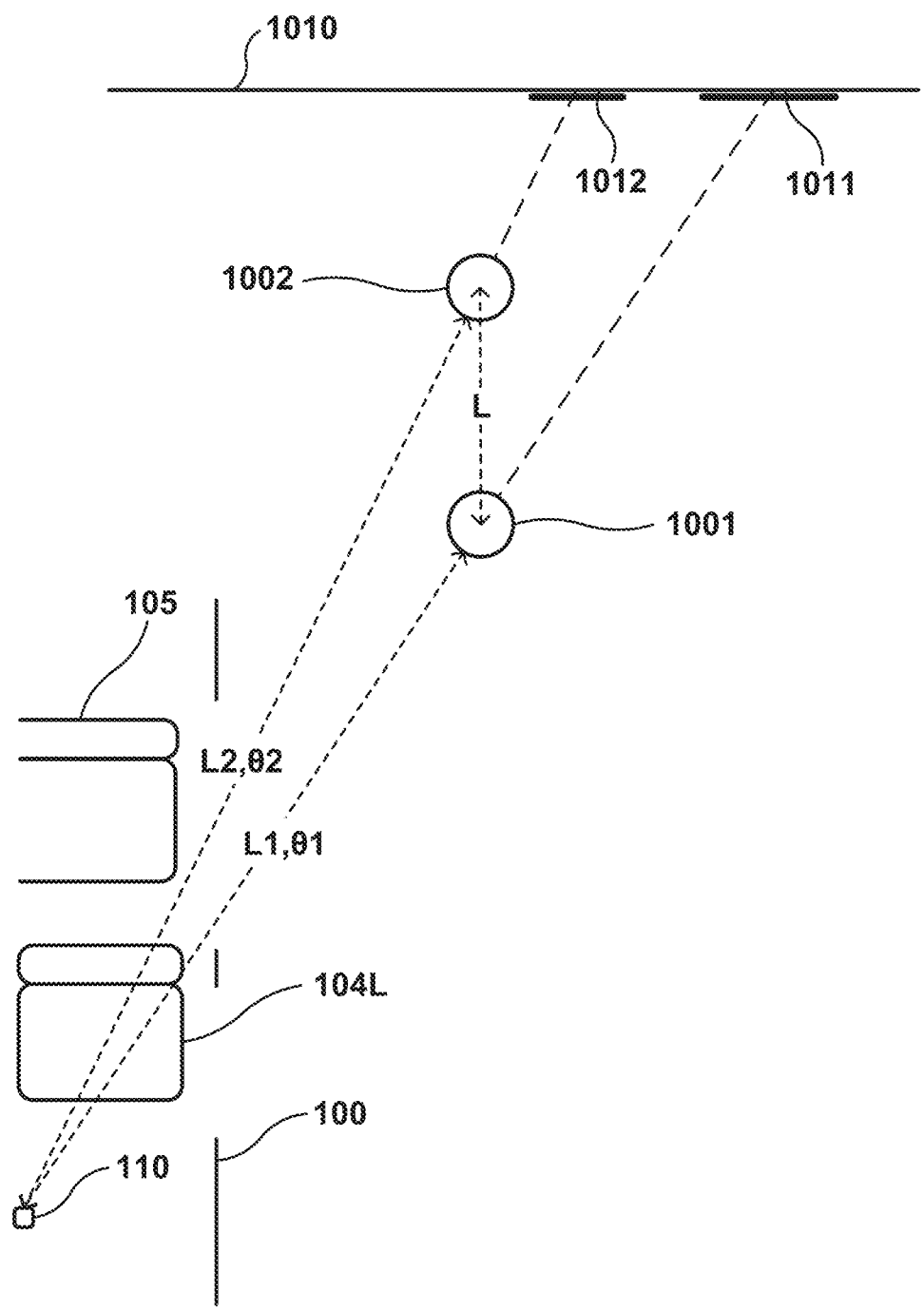
FIG. 10 is a diagram illustrating a principle of how to estimate a speed.

FIG. 10 shows an example of how to estimate a speed. An image in a frame 1010 corresponding to a target object 1001 detected from the previous frame is a target object image 1011. On the other hand, an image in the frame corresponding to a target object 1002 detected from the target frame is a target object image 1012. The position of the target object changes as the vehicle 100 moves, but the target object 1001 and the target object 1002 are the same target object. A distance estimated from the target object image 1011 is denoted by L1, and a direction is denoted by θ1. On the other hand, a distance estimated from the target object image 1012 is denoted by L2, and a direction is denoted by θ2. Note that the direction of the target object is represented relative to the direction of the optical axis of the inside camera 101 passing along the center line in the vehicle longitudinal direction.

At this time, a traveling direction component of the vehicle 100 of the distance L1 is L1·cos(θ1), and a traveling direction component of the vehicle 100 of the distance L2 is L2·cos(θ2), so that the difference L is obtained by L2 cos(θ2)−L1·cos(θ1). The speed can be estimated by dividing the distance by a time corresponding to each frame interval. When the frame rate is F(fps), and the length is expressed in meters, the speed is L·F(m/s). As described above, the speed is estimated from the captured image. This is merely an example, and the estimation can be performed by a different method, and the different method may be used.

The speed of the vehicle 100 can be estimated by the above procedure. The estimated speed can be referred to in the driving assistance processing shown in FIG. 6. Further, the masking processing performed on the moving object in the captured image allows the speed to be estimated with high accuracy.

Other Driving Assistance Procedure

With the same configuration as in the present embodiment, the estimated speed can be used in, for example, driving assistance processing shown in FIG. 11. FIG. 11 shows a procedure of predicting the possibility of contact with the target object and outputting a warning. In this example, the speed including the traveling direction is obtained as the spatial motion of the vehicle 100, and the driving assistance is provided based on the speed thus obtained. The procedure shown in FIG. 11 is performed in real time by the CPU 204 on, for example, video captured by the outside camera 102.

First, frames of the video captured by the outside camera 102 are acquired and then subjected to image recognition (S1101) for detecting the target object (S1103). The target object to be detected can be an obstacle while traveling on a road, and may be a vehicle, a person, a facility installed beside a road, or the like. Further, the target object is not a specific target object, and may be something other than a road. Next, a distance to and a direction (or a position) of the target object are estimated (S1105). This may be performed by, for example, the same method as the method described for step S307 shown in FIG. 3.

Next, a speed vector of the vehicle 100 including the traveling direction is estimated based on the left and right speeds of the vehicle 100 obtained by the procedure shown in FIG. 3 (S1107). A width (tread) between the left and right wheels of the vehicle is a fixed value, so that left and right speed vectors each starting from a corresponding end of the tread are assumed, for example. When the tread of the front wheels and the tread of the rear wheels are different from each other, an average value of the treads may be used, for example. The speed vectors each have a corresponding one of the left and right speeds estimated by the procedure shown in FIG. 3 as a magnitude and a direction that is the forward direction of the vehicle 100. Then, a vector in a direction of the normal to a line segment connecting the respective end points of the speed vectors and having an average value of the left and right speeds as a magnitude is set as a speed vector of the vehicle 100. That is, a difference in magnitude between the vectors obtained based on one of the left and right speed vectors determined as a reference is denoted by Vf, and the tread of the vehicle 100 is denoted by Tw. In this case, a vector having a direction inclined by Vf/Tw relative to the direction of the speed vector determined as a reference and the magnitude Vf is estimated to be the speed vector of the vehicle 100. This is merely an example, and the speed may be estimated by other methods.

From the speed of the self-vehicle estimated in S1107, a determination is made as to whether there is a possibility that the vehicle 100 approaches within a predetermined distance from the target object, the distance to and the direction of which have been estimated in S1105, and when there is the possibility, a time until the vehicle 100 approaches and comes into contact is estimated (S1109). For example, when the detected target object is located on a line corresponding to the estimated speed vector extending from the current position of the vehicle or within the predetermined distance from the line, it can be determined that there is the possibility that the vehicle approaches within the predetermined distance. Further, a time until the vehicle reaches the position of the target object can be estimated by dividing a distance from the position of the target object to the vehicle 100 by the magnitude of the estimated speed.

Next, when there is the possibility of contact, and the time until contact has been estimated, the time is compared with a predetermined threshold, and when the time is equal to or less than the threshold, a warning is output (S1111). The warning may be output in visual or audio from the output unit 207, may be output to a smartphone, or may be output via a connected display audio device. As described above, it is possible to predict the possibility of contact with the target object and warn the driver when there is the possibility. As described above, it is possible to predict the possibility of excessive approach to the target object and warn the driver when there is the possibility.

As described above, according to the present embodiment, the moving object appearing in the captured image is masked, so that it is possible to estimate the absolute speed of the vehicle, that is, the ground speed, rather than the relative speed with respect to the moving object. Further, the moving object to be masked includes not only the moving object outside the vehicle but also the moving object inside the vehicle, so that it is possible to predict the speed without distinguishing between the inside of the vehicle and the outside of the vehicle in the image. Further, the speed on each of the left and right sides through the left and right windows of the vehicle is estimated, so that it is possible to estimate the traveling direction of the vehicle from the image.

First Modification

According to the first embodiment, the front-view image or the back-view view image is captured, and the speed is estimated based on the difference between the images. According to the second embodiment, the same processing is performed on the side-view image. As in the second embodiment, a determination is made as to whether the vehicle is turning from the images of the outside of the vehicle captured through the left and right windows by a camera having a wide angle of view particularly from the vicinity of the center of the front seat toward the vehicle interior direction (that is, the rear). In the images captured through the right and left windows, the object in the images moves back and forth (that is, in the horizontal direction of the images). Therefore, according to the present embodiment, the masking processing is performed on each of the left and right images as shown in FIGS. 7A and 7B, and a correlation between the frames is detected in the manner as described with reference to FIG. 5 to take a difference in the horizontal direction. As a result, a difference between the left images (frames) and a difference between the right images (frames), the images being captured at time intervals, are detected. It can be determined that a side having a larger difference corresponds to the outer side of the turn.

In this case, a sign of the difference is predetermined in accordance with the direction, and the left and right differences including their respective signs are evaluated. Note that the signs of the left and right differences are opposite to each other. For example, in the case of the images captured through the right window, during straight traveling, the newer the image, the more the object moves rightward. Therefore, when the object having a correlation between frames moves rightward with the lapse of time, the sign of the difference is set to positive, and when moving leftward, the sign of the difference is set to negative. As for the image captured through the left window, the signs are set in an opposite way. Thereafter, a determination is made as to whether the difference between the left images is larger or smaller than the difference between the right images. When the difference between the right images is smaller, the turning direction can be determined to be right, and when the difference between the left images is smaller, the turning direction can be determined to be left. The reason why the sign is set is because, for the image adjacent to the center of the turn, the shift direction of the object having a correlation between images (frames) may be opposite to the shift direction during straight traveling.

Alternatively, the movement amount of the object is larger in the image captured through the window adjacent to the outer side of the turn, and there may be a case where a correlation between images cannot be obtained depending on the frame rate or the shift amount of the image shown in FIG. 5. Conversely, the movement amount of the object is smaller in the image captured through the window adjacent to the inner side of the turn. Therefore, when a correlation is obtained only for the image captured through one of the windows, it can be determined that the vehicle is turning with the side having the correlation as the center of the turn. As described above, it is also possible to determine whether the vehicle is traveling straight or turning from the image of the side-view seen from the vehicle.

Second Modification

A monocular camera is used as the inside camera 101, but the use of a binocular stereo camera allows the distance to and direction of the target object to be obtained based on a disparity between images captured by the respective cameras. In this case, it is not necessary to store in advance a relationship between the size of the target object and the distance to the target object, a relationship between the ground contact position and the distance, or the like. Further, in the above-described embodiments, the moving object is masked, but the moving object may be simply removed from the range in which the target object is recognized without manipulating the image.

Summary of Embodiments

The above-described present embodiments are summarized as follows.

According to a first aspect of the present invention, there is provided an image processing apparatus including:
an image acquisition unit; and
a processing unit configured to process an image acquired by the image acquisition unit, in which
the processing unit
recognizes a moving object from the image acquired by the image acquisition unit, performs masking processing on the moving object recognized in the image, and
estimates spatial motion of the image processing apparatus based on the image subjected to the masking processing.

According to this configuration, the masking processing performed on the moving object allows the motion to be estimated with high accuracy without the effect of motion of the moving object.

According to a second aspect of the present invention, there is provided the image processing apparatus in addition to the first aspect, in which
the image acquisition unit is provided in an internal space separated from an outside, the image includes an image of the internal space and an image of an external space, and the moving object includes a moving object estimated to be located in the external space.

According to this configuration, it is possible to estimate the motion with high accuracy without the effect of motion of the moving object located in the external space.

According to a third aspect of the present invention, there is provided the image processing apparatus in addition to the second aspect, in which
the moving object further includes a moving object estimated to be located in the internal space.

According to this configuration, it is possible to estimate the motion with high accuracy without the effect of motion of the moving object located in the internal space.

According to a fourth aspect of the present invention, there is provided the image processing apparatus in addition to the first to third aspects, in which
the image acquisition unit acquires an image of the outside through a transparent part provided in a partition between the internal space separated from the outside and the external space.

According to this configuration, it is possible to estimate the motion based on the image of the external space even seen from the internal space separated from the outside.

According to a fifth aspect of the present invention, there is provided the image processing apparatus in addition to the fourth aspect, in which
the transparent part is provided at a plurality of positions to have symmetry with respect to a plane, and the image acquisition unit includes a camera and is disposed to cause an optical axis to be along the symmetry plane having symmetry with respect to the plane.

According to this configuration, it is possible to acquire the images of the external space through the transparent parts symmetrically arranged in one image and estimate the motion from each of the image.

According to a sixth aspect of the present invention, there is provided the image processing apparatus in addition to the fifth aspect, in which
the image processing apparatus is mounted on a vehicle, and the internal space is an inside of a vehicle interior, and the camera is provided in the vehicle interior to face a rear of the vehicle.

According to this configuration, the inside camera of the vehicle can acquire images through the left and right transparent parts provided in the vehicle, and the motion of the vehicle can be estimated from each of the images.

According to a seventh aspect of the present invention, there is provided the image processing apparatus in addition to the first to sixth aspects, in which
the processing unit performs the masking processing on at least two images acquired at a certain time interval, and estimates a movement speed of the vehicle based on a difference between the at least two images subjected to the masking processing.

According to this configuration, the masking processing performed on at least two images acquired at the time interval allows the motion to be estimated with high accuracy without the effect of motion of the moving object. It is further possible to estimate the speed by simple processing.

According to an eighth aspect of the present invention, there is provided the image processing apparatus in addition to the first to sixth aspects, in which
the processing unit performs the masking processing on at least two images acquired at a certain time interval, estimates positions of the same target object appearing in both the at least two images subjected to the masking processing, and estimates, as the spatial motion, a movement speed of the vehicle based on a difference between the estimated positions.

According to this configuration, the masking processing performed on the moving object appearing in both the at least two images acquired at the time interval allows the motion to be estimated with high accuracy without the effect of motion of the moving object.

According to a ninth aspect of the present invention, there is provided the image processing apparatus in addition to the first to eighth aspects, in which
the processing unit performs the masking processing on at least two images acquired at a certain time interval, and estimates a turning direction of the vehicle based on a difference between the at least two images subjected to the masking processing.

According to this configuration, the masking processing performed on the moving object appearing in both the at least two images acquired at the time interval allows the turning direction to be estimated with high accuracy without the effect of motion of the moving object.

According to a tenth aspect of the present invention, there is provided the image processing apparatus in addition to the ninth aspect, in which
the processing unit shifts, in accordance with the turning direction, a direction that brings the at least two images into correlation.

According to this configuration, it is possible to bring the images into correlation with higher reliability.

According to an eleventh aspect of the present invention, there is provided the image processing apparatus in addition to the fifth or sixth aspect, in which
the processing unit estimates a traveling direction of the vehicle based on a difference between images captured through the transparent parts provided to have symmetry with respect to the plane.

According to this configuration, it is possible to estimate the turning direction of the vehicle or the like only from the images.

The invention is not limited to the foregoing embodiments, and various variations/changes are possible within the spirit of the invention.

What is claimed is:

1. An image processing apparatus comprising:
a camera; and
a processing unit configured to process an image acquired by the camera, wherein
the processing unit includes
at least one processor and at least one memory storing at least one program, and
the at least one program causes the at least one processor to:
recognize a moving object from the image acquired by the camera, perform masking processing on the moving object recognized in the image; and
estimate spatial motion of the image processing apparatus based on the image subjected to the masking processing,
wherein estimation of the spatial motion includes:
generating a plurality of scaled images by scaling a captured first image with a plurality of different scale factors,
capturing a second image after a predetermined time has elapsed since the first image was captured, and
estimating a movement speed based on a scale factor of a scaled image of which a difference from the second image is the smallest difference among the plurality of scaled images.

2. The image processing apparatus according to claim 1, wherein
the camera is provided in an internal space separated from an outside, the image includes an image of the internal space and an image of an external space, and the moving object includes a moving object estimated to be located in the external space.

3. The image processing apparatus according to claim 2, wherein
the moving object further includes a moving object estimated to be located in the internal space.

4. The image processing apparatus according to claim 1, wherein
the camera acquires an image of outside through a transparent part provided in a partition between the internal space separated from the outside and an external space.

5. The image processing apparatus according to claim 4, wherein
the transparent part is provided at a plurality of positions to have symmetry with respect to a plane, and
the camera is disposed to cause an optical axis to be along the plane and to have symmetry with respect to the plane.

6. The image processing apparatus according to claim 5, wherein
the image processing apparatus is mounted on a vehicle, and the internal space is an inside of a vehicle interior, and the camera is provided in the vehicle interior to face a rear of the vehicle.

7. The image processing apparatus according to claim 1, wherein
the image processing apparatus is mounted on a vehicle, and
the at least one program causes the at least one processor to perform the masking processing on at least two images acquired at a certain time interval, and estimate a movement speed of the vehicle based on a difference between the at least two images subjected to the masking processing.

8. The image processing apparatus according to claim 1, wherein
the image processing apparatus is mounted on a vehicle, and
the at least one program causes the at least one processor to perform the masking processing on at least two images acquired at a certain time interval, estimate positions of a same target object appearing in both the at least two images subjected to the masking processing, and estimate, as the spatial motion, a movement speed of the vehicle based on a difference between the estimated positions.

9. The image processing apparatus according to claim 1, wherein
the image processing apparatus is mounted on a vehicle, and
the at least one program causes the at least one processor to perform the masking processing on at least two images acquired at a certain time interval, and estimate a turning direction of the vehicle based on a difference between the at least two images subjected to the masking processing.

10. The image processing apparatus according to claim 9, wherein
the at least one program causes the at least one processor to shift, in accordance with the turning direction, a direction that brings the at least two images into correlation.

11. The image processing apparatus according to claim 5, wherein
the image processing apparatus is mounted on a vehicle, and
the at least one program causes the at least one processor to estimate a traveling direction of the vehicle based on a difference between images captured through the transparent parts provided to have symmetry with respect to the plane.

* * * * *